(12) United States Patent
Lallican

(10) Patent No.: US 9,875,254 B2
(45) Date of Patent: Jan. 23, 2018

(54) METHOD FOR SEARCHING FOR, RECOGNIZING AND LOCATING A TERM IN INK, AND A CORRESPONDING DEVICE, PROGRAM AND LANGUAGE

(75) Inventor: Pierre-Michel Lallican, Petit Mars (FR)

(73) Assignee: MYSCRIPT, Nantes (FR)

( * ) Notice: Subject to any disclaimer, the term of this patent is extended or adjusted under 35 U.S.C. 154(b) by 1463 days.

(21) Appl. No.: 11/813,680

(22) PCT Filed: Jan. 10, 2006

(86) PCT No.: PCT/EP2006/050136
§ 371 (c)(1),
(2), (4) Date: Feb. 4, 2008

(87) PCT Pub. No.: WO2006/075001
PCT Pub. Date: Jul. 20, 2006

(65) Prior Publication Data
US 2009/0077053 A1    Mar. 19, 2009

(30) Foreign Application Priority Data

Jan. 11, 2005 (FR) ..................................... 05 00282
Feb. 22, 2005 (FR) ..................................... 05 01799

(51) Int. Cl.
*G06F 7/00* (2006.01)
*G06F 17/30* (2006.01)
*G06K 9/22* (2006.01)

(52) U.S. Cl.
CPC ....... *G06F 17/30253* (2013.01); *G06K 9/222* (2013.01)

(58) Field of Classification Search
CPC ................................................. G06F 17/30253
(Continued)

(56) References Cited

U.S. PATENT DOCUMENTS 5,265,242 A    11/1993  Fujisawa et al.
5,949,906 A *   9/1999  Hontani et al. ............... 382/177
(Continued)

FOREIGN PATENT DOCUMENTS

WO        WO 02/17166 A    2/2002

OTHER PUBLICATIONS

M. Sonius, Written Opinion of the International Searching Authority dated Feb. 21, 2006, International Application No. PCT/EP2006/050136, pp. 1-10 (including English Translation).
(Continued)

*Primary Examiner* — Kimberly Wilson
(74) *Attorney, Agent, or Firm* — MH2 Technology Law Group, LLP

(57) ABSTRACT

A method for searching for at least one term, consisting of at least one character, in at least one set of ink data is disclosed. This method advantageously includes an operation for converting ink data into intermediate data, in an intermediate format, in the form of at least one segmentation graph, each node of one of the graphs including at least one ink segment associated with at least one assumption of correspondence with a recognition unit, and an operation for searching for the term or terms, carried out on the intermediate data, the conversion operation being carried out once and for all during storage of one of the sets of data, and the search operation being capable of being carried out at any time.

23 Claims, 5 Drawing Sheets

(58) Field of Classification Search
USPC .......................................... 707/999.005, 766
See application file for complete search history.

(56) References Cited

U.S. PATENT DOCUMENTS

| | | | |
|---|---|---|---|
| 7,382,921 B2* | 6/2008 | Lossev et al. ................ | 382/187 |
| 2002/0051574 A1* | 5/2002 | Kashioka et al. ............ | 382/199 |
| 2002/0154817 A1* | 10/2002 | Katsuyama et al. .......... | 382/190 |
| 2003/0101163 A1 | 5/2003 | Liu et al. | |
| 2003/0123730 A1* | 7/2003 | Kim et al. .................... | 382/177 |
| 2004/0213455 A1* | 10/2004 | Lossev et al. ................ | 382/159 |
| 2005/0163377 A1* | 7/2005 | Walch ........................... | 382/187 |
| 2005/0222848 A1* | 10/2005 | Napper ............. | G06F 17/30244 |
| | | | 705/1.1 |
| 2006/0050962 A1* | 3/2006 | Geiger et al. ................ | 382/186 |

OTHER PUBLICATIONS

Shuji Senda et al., "Document Image Retrieval System Using Character Candidates Generated by Character Recognition Process", Document Analysis and Recognition, Proc. 2nd ICDAR, Tsukuba, Japan, 1993 pp. 541-546.

T. Fujisaki et al., "Online Recognizer for Runon Handprinted Characters," Proceedings of the 10th International Conference on Pattern Recognition, Atlantic City, U.S., Jun. 16-21, 1990, pp. 450-454.

Jeroen Bakker, Notification According to Article 92(e) EPC dated Feb. 15, 2015, European Application No. 06700742.7, pp. 1-13 including English Translation).

* cited by examiner

METHOD FOR SEARCHING FOR, RECOGNIZING AND LOCATING A TERM IN INK, AND A CORRESPONDING DEVICE, PROGRAM AND LANGUAGE

FIELD OF THE INVENTION

The field of the invention is that of searching for and recognising terms in documents stored in digital format.

In particular, the invention relates to searching for information within documents, referred to as ink documents, i.e., prepared in handwriting and previously stored directly in this format, in a document information system, for example. The invention can also be applied to other types of documents and, for example, dictated documents.

Owing to the significant increase in the calculating and/or backup capabilities of desktop computers, but also of all other types of terminals, for the most part mobile, like personal digital assistant (or PDA), notepads, mobile telephones, etc., it has become possible to be able to acquire and store data and/or documents directly in their original handwritten format, without being previously converted into any standardised computer format.

However, once such ink documents have been acquired and stored, processing the data and/or handwritten information that they contain requires the use of specific and complex tools. These tools most often enable conversion of the stored data or information into elements belonging to a lexicon, and searching within the ink document or documents for converted words, phrases or annotations.

SOLUTIONS OF THE PRIOR ART

Thus, systems are known which make it possible to convert a sequential language, typically speech or handwriting, into a chain of elements understandable to a data processing system, which are encoded in an ASCII, ISO-Latin-1 or UNICODE type format.

Also known among the systems of the prior art are systems enabling direct backup, e.g., on a computer hard drive, of ink documents input in their original handwritten format.

Searching for data and/or information in one or more of the stored ink documents requires the ability to compare the data being searched for, contained in the request, with the data from the stored ink documents. In this sense, several solutions have been anticipated:
- to compare the stored ink data with the contents of the request, when this request is also input in handwritten form;
- to compare the stored ink data with the contents of a request input in a text format (ASCII, for example), and converted into handwriting;
- to compare the stored ink data, which is converted into a text format (ASCII, for example), with the contents of a request itself in text format.

The first two approaches are, of course, heavy and demanding in terms of their load on the processor (CPU) and memory. They do not enable efficient processing in a reasonable period of time. The third approach assumes prior conversion into characters, generally with the aid of a lexicon. Thus, it introduces a bias, since the conversion is limited to one language, and to the terms actually present in the lexicon.

One difficulty with search processes lies primarily in the fact that the data that is searched for in stored documents is not always of the same nature as that used in the query language.

Therefore, it is important that the technique used makes it possible to draw the connection between this heterogeneous data, which involves associating with the search function, a function for recognising the searched for data in all or a portion of the stored ink documents.

Such recognition systems are known, which are most often based on complex computer processing on the other hand requiring significant processing capabilities, which are highly demanding in terms of the processor (CPU) and memory load.

Thus, the majority of the recognition systems of the prior art use one or more processes, among which are included:
- conversion of the ink data into a character-level format (ASCII or the like), that can be interpreted directly by a computer terminal;
- comparison between the character-formatted data and a data model most often assuming the form of a lexicon.

Thus, a first disadvantage of these recognition systems of the prior art relates to the necessity of using a lexicon with often fixed and limited contents, in terms of the quantity and meaning of the words that it contains.

Furthermore, the use of such a lexicon entails a significant limitation in terms of the quality of the search result, this result necessarily depending on the language, the comprehensiveness and the scope of the lexicon. For this reason, the recognition techniques of the prior art, at least in some cases, return mediocre results, and neither do they enable searching for proper names, company names, or any other chain of characters or symbols that may have been written into the ink documents considered in the search but not present in the lexicon.

Furthermore, the use of a lexicon in the recognition phase most often produces relatively long response times in processing the request and in returning the search results to the user.

In order to overcome the aforesaid disadvantage, certain other techniques of the prior art are based on the use of indexing methods the primary role of which is to pre-organise the data and/or information contained in the ink documents in which the search must be applied. However, on the other hand, the use of such an indexing method in a search context requires the contents of the ink documents to have previously undergone at least a partial recognition process.

With this objective, and in order to reduce the overall search time, some techniques propose carrying out a preliminary recognition of the contents of the stored ink documents, and then storing the result of this recognition, e.g., on a hard drive of a computer or a server, and finally, launching the search, no longer on the original contents of the stored ink documents, but on the result of the preliminary recognition carried out, as in the American patent document No.: US 2003 101163.

In these known techniques, indexing is performed exclusively at the word level, and a confidence score is assigned to each word in order to estimate the probability that a searched word does or does not correspond to one of the indexed words.

Although improving the response time for processing the search and/or for the recognition process, these techniques of the prior art prove to be disappointing in terms of the quality of the recognition. Furthermore, they are limited in terms of search capabilities. To illustrate, with these techniques, it is as a matter of fact impossible to search for words that might not be entered into the lexicon having been used in the recognition of the previously stored documents. The same applies to searching for acronyms, trademarks, proper names and any other abbreviation or chain of characters and/or symbols not previously defined in the lexicon.

The advantage of these known techniques of the prior art is therefore severely limited to searching in previously stored and lexicographed documents, which stand in the way of a natural and extensive use of systems for searching and recognising in ink documents, e.g., for the purposes of querying a company document database, a document system, etc.

Finally, due to the lexical approach that they impose, another disadvantage of these search and recognition systems relates to their incapability of mitigating an alteration of the contents of a document, which might have occurred at the time it was stored, or else even mitigating an error and/or an approximation of the input of the request made by the user. As a matter of fact, as soon as a user inputs a word containing a spelling error or a keystroke error into their request, the search and recognition system will not return any result, whereas it could return a close result.

In summary, the known search and/or recognitions techniques of the prior art have substantially five types of disadvantages:

1. Problems related to the word segmentation of ink documents the use of which is liable to cause errors during the search phase.
2. Problems related to the lack of comprehensiveness of the indexing file, due to the conversion of the data into elements belonging to a lexicon, capable of producing situations in which a user search request cannot be recognized, e.g., due to a spelling or keystroke error, or due to inputting proper or company names, or acronyms;
3. Problems peculiar to poorly executed recognition of ink documents, resulting in the creation of a faulty indexing file the use of which is liable to cause errors in the phase of searching for poorly recognised words.
4. Problems related to the user request, which does not make it possible to overcome the linguistic constraint but which, on the contrary, must be input in the same language as that of the lexicon. Correspondingly, any search launched on the basis of a user request, which does not observe the same linguistic constraints as those of the indexing file, will not be able to be processed by the recognition system. This last problem probably constitutes one of the primary barriers to a more natural and extensive use of the systems for searching and recognising in ink documents;
5. Problems related to the impossibility of being able to perform advanced searches on the basis of a request input in a higher level language, of the regular expression type, for example, for the purpose of more fully formalising the contents of the request from which the processing of the search may be carried out more quickly, while at the same time providing the user with a higher degree of quality with respect to the results returned.

Furthermore, it is to be noted that, for the most part, the above-listed disadvantages apply similarly to voice recognition. In the latter case, a "term" can also correspond to a sound, a syllable, etc.

PRELIMINARY DEFINITIONS

In the remainder of this document, the following terminology shall be considered to have the meanings defined below:

Character: by character it is understood to mean a letter, figure, punctuation sign or space used in literary composition, a unit written mark (in the sense of an ASCII character or symbol, for example).

Term: by term it is understood to mean any succession or chain containing at least one handwritten character and/or symbol or typewritten text, with or without any particular meaning.

Ink segment: ink segment defines any portion of the outline of a character delimited by two consecutive adjacent segmentation points arranged on the outline of said character (203 to 206).

Recognition unit: this is defined as the lowest level element on which a search may be carried out. Within the scope of this description, the recognition unit considered as such is the character. It is well understood that the level of granularity considered for a recognition unit can be chosen in a different way.

Segmentation graph: a graph consisting of a plurality of nodes each containing at least one ink segment capable of belonging to a piece of data. Each node of the graph can be connected upstream and/or downstream to other nodes of the segmentation graph, so that the possible relationships of ascendancy and/or descendancy might be established between the ink segments contained in each of the interconnected nodes.

Character hypothesis: this is defined as the set of ink segments associated with a node of the segmentation graph (209).

Character candidate: this is defined as the assumption of correspondence between an ink segment set associated with a node of the segmentation graph and a character (211).

OBJECTIVES OF THE INVENTION

In particular, the objective of the invention is to overcome these drawbacks of the prior art.

More precisely, one objective of the invention is to provide a technique for searching for and recognising terms, in particular but not exclusively within ink documents, which has a fast execution time on a computer and/or on any other stationary or mobile terminal.

Another objective of the invention is to provide such a technique which makes it possible to substantially increase the possibilities of searching for and recognising any succession of terms, according to the preceding definition, whether it be with or without meaning.

An additional objective of the invention is to provide such a technique which makes it possible to do without the use of a limited-content lexicon.

Another objective of the invention is to provide such a technique which is independent of any linguistic constraint.

Yet another objective of the invention is, of course, to provide such a technique which ensures very good search and/or recognition results, even in the presence of potential errors in the stored ink documents, or else during inputting of the contents of the search request by the user.

The invention also has the objective of providing such a technique which, in terms of implementing, is simple and of a reasonable cost.

Essential Characteristics of the Invention

These objectives, as well as others which will become apparent later, are achieved with the aid of a method for searching for at least one term, consisting of at least one character, in at least one set of ink data. According to the invention, a method such as this advantageously includes an operation for converting ink data into intermediate data, in an intermediate format, in the form of at least one segmentation graph, each node of one of the graphs including at least one ink segment associated with at least one assumption of correspondence with a recognition unit, and an operation for searching for the term or terms, carried out on the intermediate data, the conversion operation being carried out once and for all during storage of one of the sets of data, and the search operation being capable of being carried out at any time.

The conversion operation advantageously includes the following steps:
- sectioning the set into at least one ink segment, each of the segments being delimited by two consecutive adjacent segmentation points;
- construction of a segmentation graph consisting of nodes connected via branches, each node of the graph including at least one of the ink segments and each branch of the graph connecting a first node to a second node in order to define a relationship of adjacency between at least one segment contained in the first node and at least one segment contained in the second node;
- association to each of the nodes of at least one predetermined assumption of correspondence with a recognition unit;
- association of at least one confidence score with each of the assumptions of correspondence with a recognition unit;
- classification of the assumptions of correspondence with a recognition unit based on the confidence scores.

The search operation preferably comprises the following steps:
- obtaining an input request including the term being searched;
- converting of the contents of the input request into at least one request automaton adapted to the intermediate format;
- searching for at least one correspondence between said term and at least one element of said intermediate data;
- presenting and/or transmitting of at least one search result.

The confidence score associated with an assumption of correspondence with a recognition unit is preferably stored in said node corresponding to said graph.

The conversion operation preferably comprises a preliminary operation for normalising the outline of the characters forming the raw ink data, via control and/or correction of at least one of the parameters belonging to the group comprising:
- an inclination value, relative to at least one reference direction;
- a coefficient of rotation, relative to at least one given axis;
- a line thickness;
- a character height and/or a width relative to at least two reference lines, so as to provide a normalised set of ink data.

The conversion step advantageously includes a step for pruning the branches of the segmentation graph the nodes of which contain assumptions of correspondence with a recognition unit having a low confidence score.

For each node of the segmentation graph, the classification step also advantageously has a list of the assumptions of correspondence with a recognition unit predetermined in order of decreasing confidence score.

The classification step preferably implements a filtering of the most probable assumption of correspondence with a recognition unit, by comparing the confidence scores with a predetermined threshold value.

The classification operation is preferably based on one of the following learning techniques, based on:
- Kohonen neural networks;
- a support vector machine;
- kernel methods
- fuzzy logic systems;
- hidden Markov models;
- neural networks.

The conversion operation advantageously includes a storage step and ensures the storage of at least some of the following information:
- a set of the nodes;
- a list of the assumptions of correspondence with a recognition unit for each of the nodes;
- a confidence score for each of the assumptions of correspondence with a recognition unit of each of the nodes;
- a location for each of the nodes in the set of stored raw ink data, the location being defined by at least one segmentation point;
- information relating to the fact that a node is adjacent to a space separating two ink segments.

The segmentation points are preferably determined according to at least one of the criteria belonging to the group including:
- an extremum and/or a minimum determined with respect to reference lines;
- an inflection point;
- in increasing slope-start;
- a decreasing slope-start;
- a stopping point due to a heightening of the writing means;
- an affixation point for the writing means;
- intersecting lines.

The searched term also advantageously belongs to the group including at least one typewritten or handwritten text character.

The request automaton is preferably of the type belonging to the group including at least one finite-state automaton.

In at least one automaton, the conversion step advantageously comprises at least the following steps:
- sectioning the contents of the request into recognition units belong to the group including at least:
  - syllables;
  - phonemes;
  - graphemes;
  - characters;
- storing each of the recognition units in a state of the request automaton.

In the preferred embodiment, the recognition unit is a character.

Each state of the request automaton then contains a character from the input request and each branch of the request automaton connects a first state with a second state defining a relationship of ascendancy/descendancy between the recognition units contained in the first and second states.

The search operation advantageously includes a matching of each of the characters contained in each of the states of the request automaton with at least one node of the graph, so as to identify the nodes of the graph having the highest probability of correspondence with the character.

Also advantageously, during the search operation, progress occurs simultaneously in the graph and in the request automaton, so that, when correspondence is between a first node of the segmentation graph and a first character contained in a first state of the request automaton was able to be established, a second state descending directly from the first state of the request automaton is selected, and a node is determined in the graph, which descends directly from the first node and which has the highest probability of correspondence with the second character.

The establishment of correspondence between the segmentation graph and the request automaton preferably uses a maximum likelihood lattice, including, along the x-axis, the graph of the ink segments and, along the y-axis, the request automaton.

Thus, the cost of a graph path and of the minimum-cost automaton with states is advantageously determined by calculating the sum of the confidence scores assigned to the nodes of the graph and to the arcs of transition between the states of the automaton.

The step for presenting and/or transmitting at least one search result preferably further returns a piece of identifying information for the set of ink data containing at least one occurrence of the searched term and/or one piece of location information for each of the occurrences within these sets of ink data.

The invention also advantageously relates to a computer programme, which may be stored on a non-transitory computer readable recording medium, including programme code instructions for executing the steps of the aforesaid method for searching for at least one term in a set of raw ink data, the term being in the form of an input signal for a request input by a user, when the programme is run on a computer that may access the non-transitory computer readable recording medium.

The invention also preferably relates to a device for searching for at least one term, consisting of at least one character, in at least one set of ink data. A device such as this, according to the invention, advantageously includes means for searching for the term or terms, carried out on intermediate data, previously stored in storage means by means for converting the ink data into intermediate data, in an intermediate format, in the form of at least one segmentation graph, each node of one of the graphs including at least one ink segment associated with at least one assumption of correspondence with a recognition unit.

The device according to the invention also advantageously belongs to the group including at least:
   a desktop or laptop computer;
   a personal digital assistant;
   a notepad;
   a mobile telecommunication terminal;
   a multimedia kiosk;
   a digital pen.

The invention also relates to a device for converting ink data for searches of at least one term, consisting of at least one character, in at least one set of ink data. According to the invention, a conversion device such as this preferably includes means for converting ink data into intermediate data, in an intermediate format, in the form of at least one segmentation graph, each node of one of the graphs including at least one ink segment associated with at least one assumption of correspondence with a recognition unit, so that the searches for the term or terms are carried out on the intermediate data. The conversion is carried out once and for all during storage of one of the sets of data and the search can be carried out at any time.

Finally, the invention advantageously relates to a regular expression language for formulating a search request from amongst a set of stored ink documents in an intermediate data format. According to the invention, such a language is convertible in the form of a request automaton capable of being exploited directly during execution of the steps of the method for searching for at least one term in a set of ink data, according to the steps of the aforesaid method, when the programme is run on a computer.

LIST OF THE FIGURES

Other characteristics and advantages of the invention will become more apparent upon reading the following description of a preferred embodiment, given for non-limiting and illustrative purposes, and from the appended drawings, in which.

Figure 3:
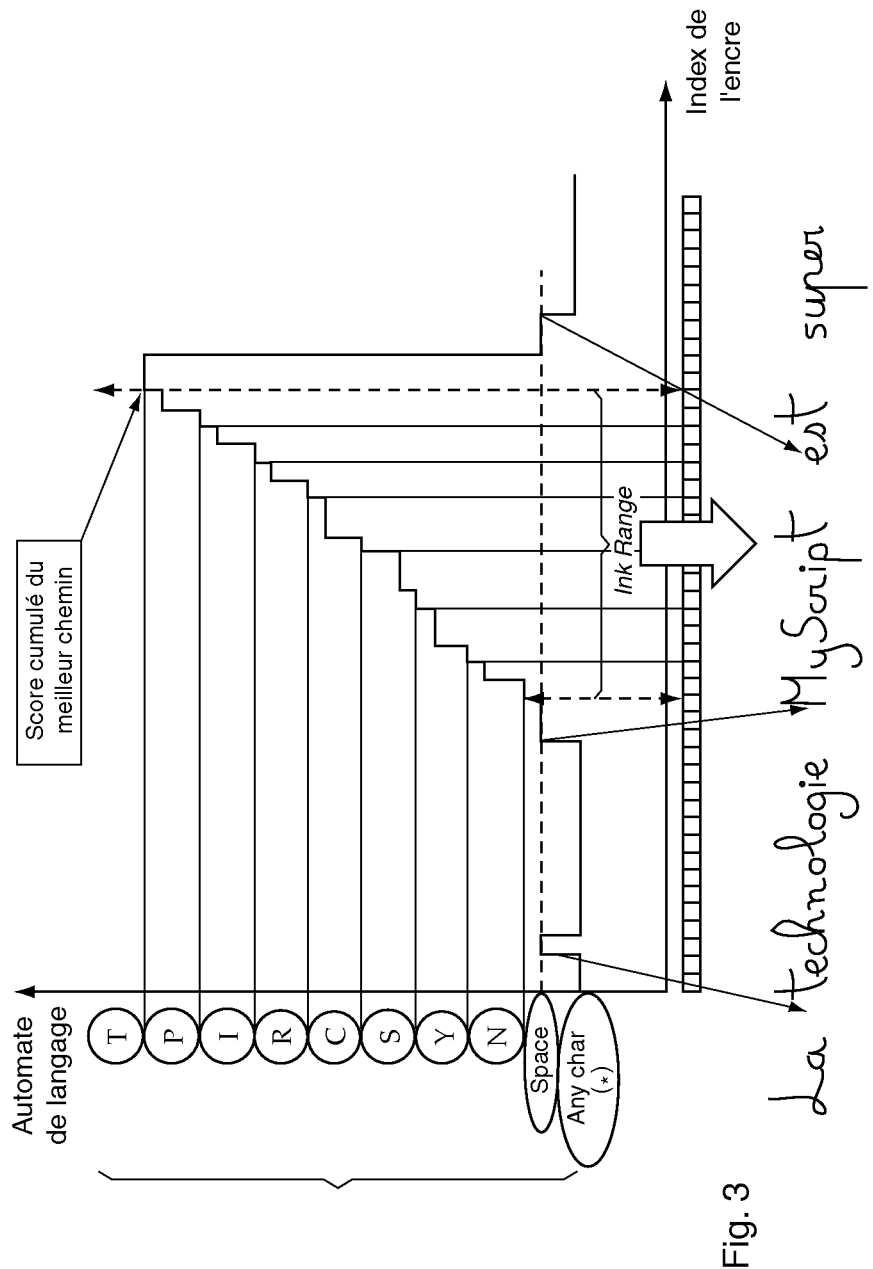
Figure 4:
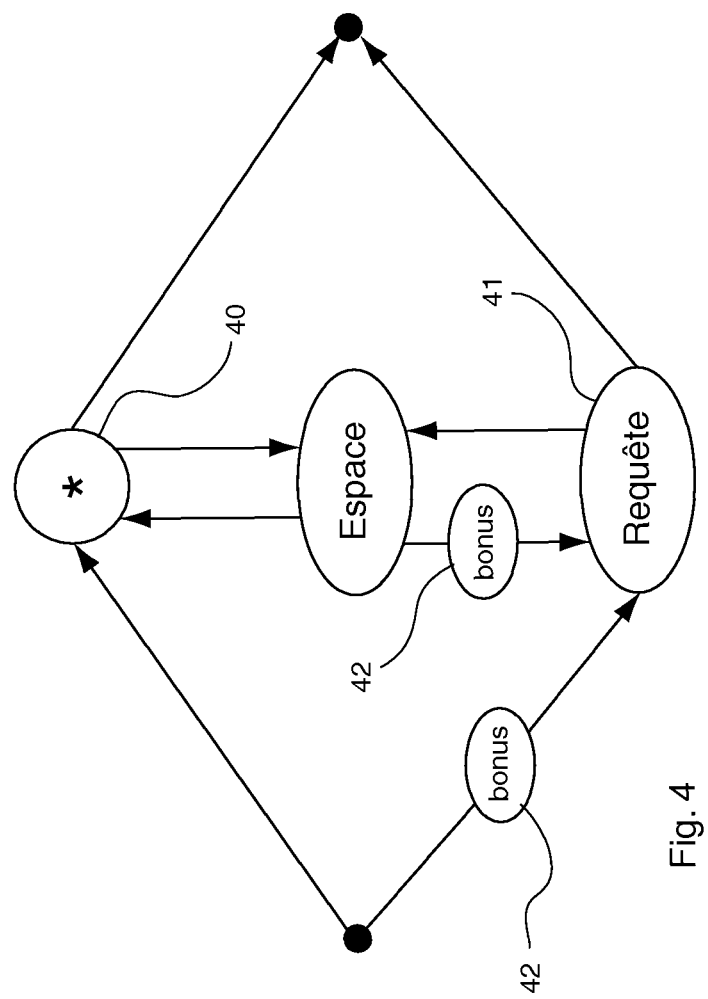
Figure 5:
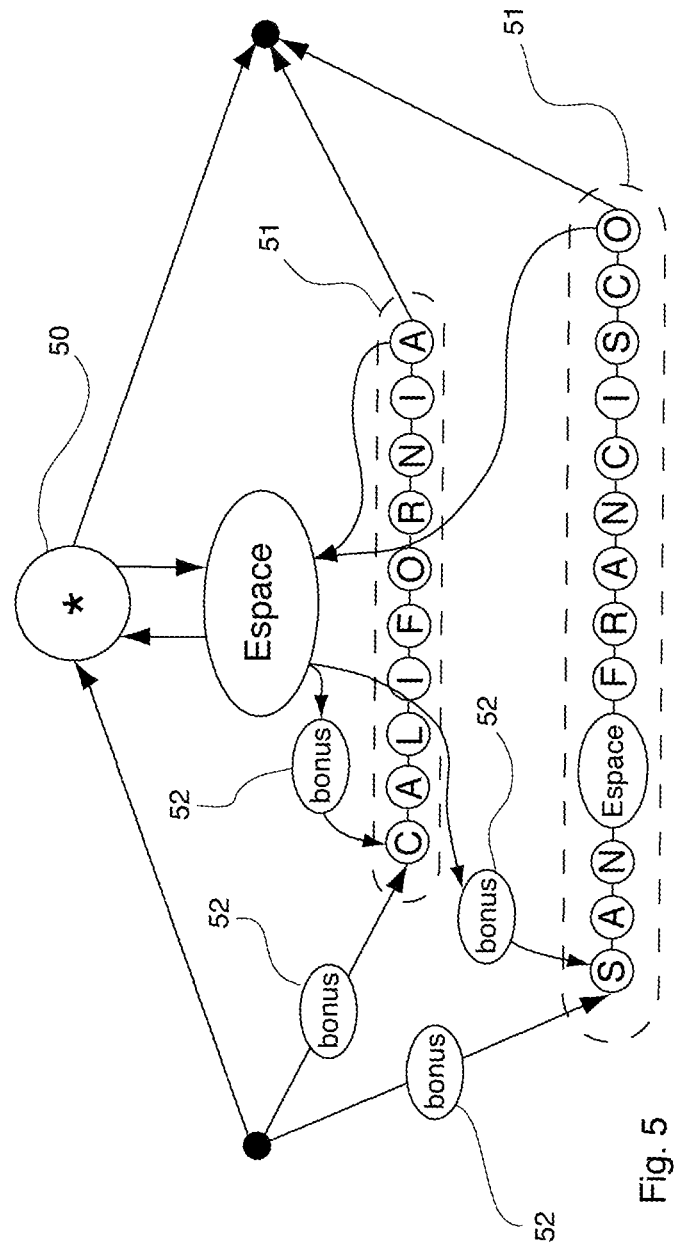

FIG. 3 describes the principle of the maximum likelihood lattice used during establishment of correspondence between the segmentation graph and the request automaton;

FIG. 4 shows a representation of the request automaton according to the invention;

FIG. 5 is an exemplary representation of the automaton obtained for a request of the type "CALIFORNIA" and "SAN FRANCISCO."

DESCRIPTION OF AN EMBODIMENT OF THE INVENTION

The embodiment described below relates to searching for terms in ink documents.

Thus, the principle of the invention is based on a novel and inventive approach to searching for and/or recognising writing (and more generally terms), which uses an operation for converting ink data, in which the search must be carried out, into intermediate data, in an intermediate format, in the form of at least one segmentation graph.

Each node of one of the graphs includes at least one ink segment extracted from the ink data, which is associated with at least one character candidate. According to the invention, the operation for searching for and/or recognising the term or terms is no longer carried out on the original data, but dynamically from intermediate data. The conversion operation is carried out once and for all at the time of storing one of the sets of data, and the search operation can thus be carried out at any time. Of course, if the document is modified, a new conversion (and a new storage) must be carried out.

Figure 1:
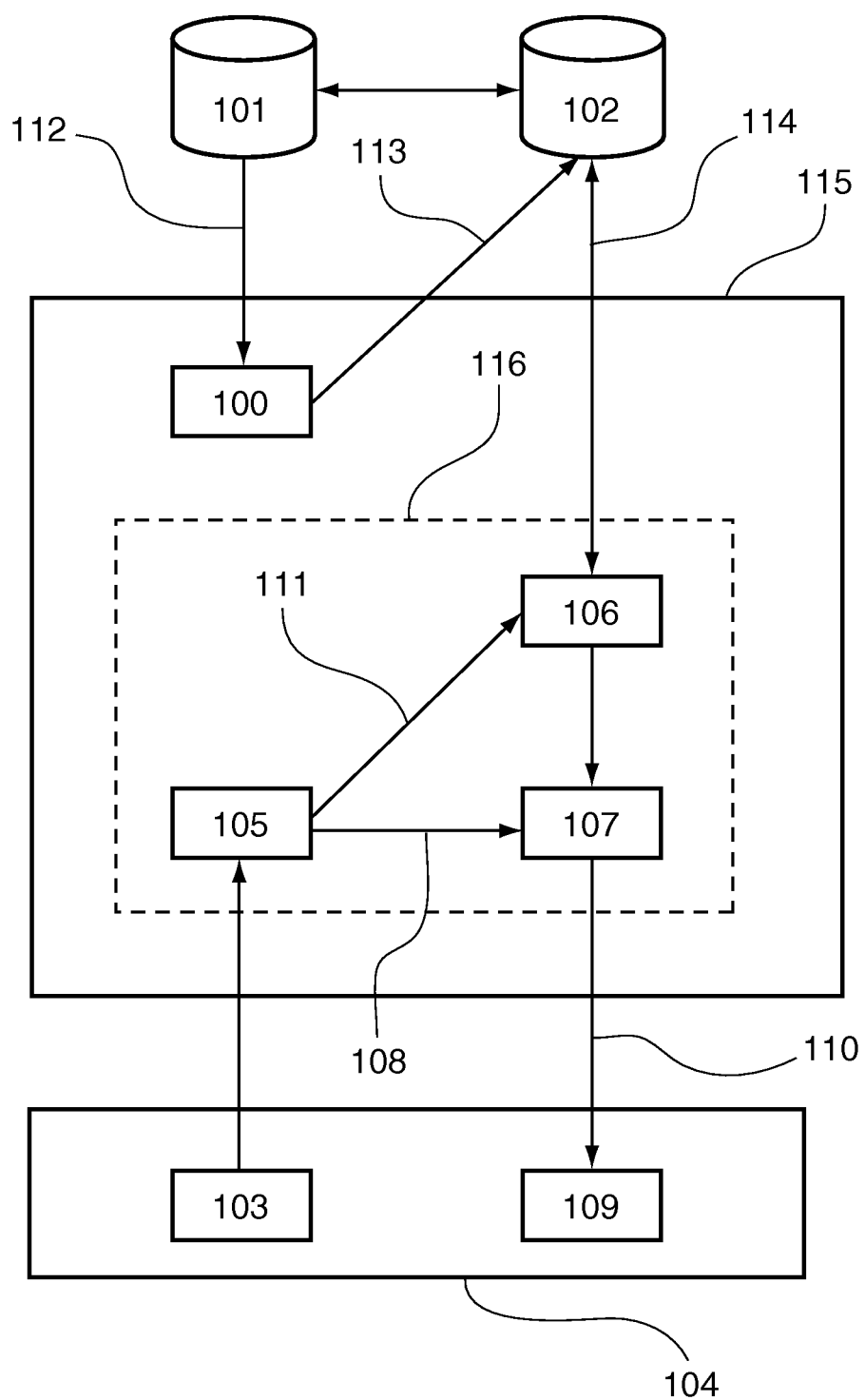
FIG. 1 is a flowchart of the various steps of the search method according to the invention, and further specifies with respect to which components of the corresponding device these various steps are executed.

As shown in FIG. 1, in this preferred embodiment, the search and/or recognition method according to the invention includes the following steps:

A. Once and for All:
  a preliminary conversion 100 of the ink documents or data 101 in which the search for and recognition of writing must be carried out, in a stored intermediate format 102, e.g., in a database system. At the input 112, the conversion operation takes the original documents or data 101 in order to process them and convert them 113 in the intermediate format file 102;
  and the storage of the intermediate format file;

B. For Each Search and/or Recognition:
  the inputting of a user request 103 from an input interface 104;
  the conversion 105 of this user request in the form of a request automaton 111 directly exploited for executing the step 106 for searching for and/or recognising within converted and stored ink documents and/or data 102;

formatting 107 the search and/or recognition result, the latter being directly influenced or oriented 108 by the contents of the converted request 105;

presentation 110 of the result or results 109 to the user, either directly in the form of a list of searched and recognised terms in the stored ink documents, or in the form of locating and highlighting one or more occurrences of the searched terms.

These various steps can be implemented and/or executed by a computer programme 115, which may be stored or otherwise included on a non-transitory computer readable recording medium, integrating, for its operation, a search and/or recognition engine the role of which consists primarily, but not exclusively, on the one hand, in the execution of the step for converting 105 the request input by the user in the form of a request automaton, and, on the other hand, in the execution of the step 106 for searching and/or recognising 114 within converted and stored ink documents and/or data 102.

It is also at the search engine 116 level that processing 107 of the results 109 obtained for the search and/or recognition of writing can be executed, before they are presented to the user via the user interface 104.

Figure 2:
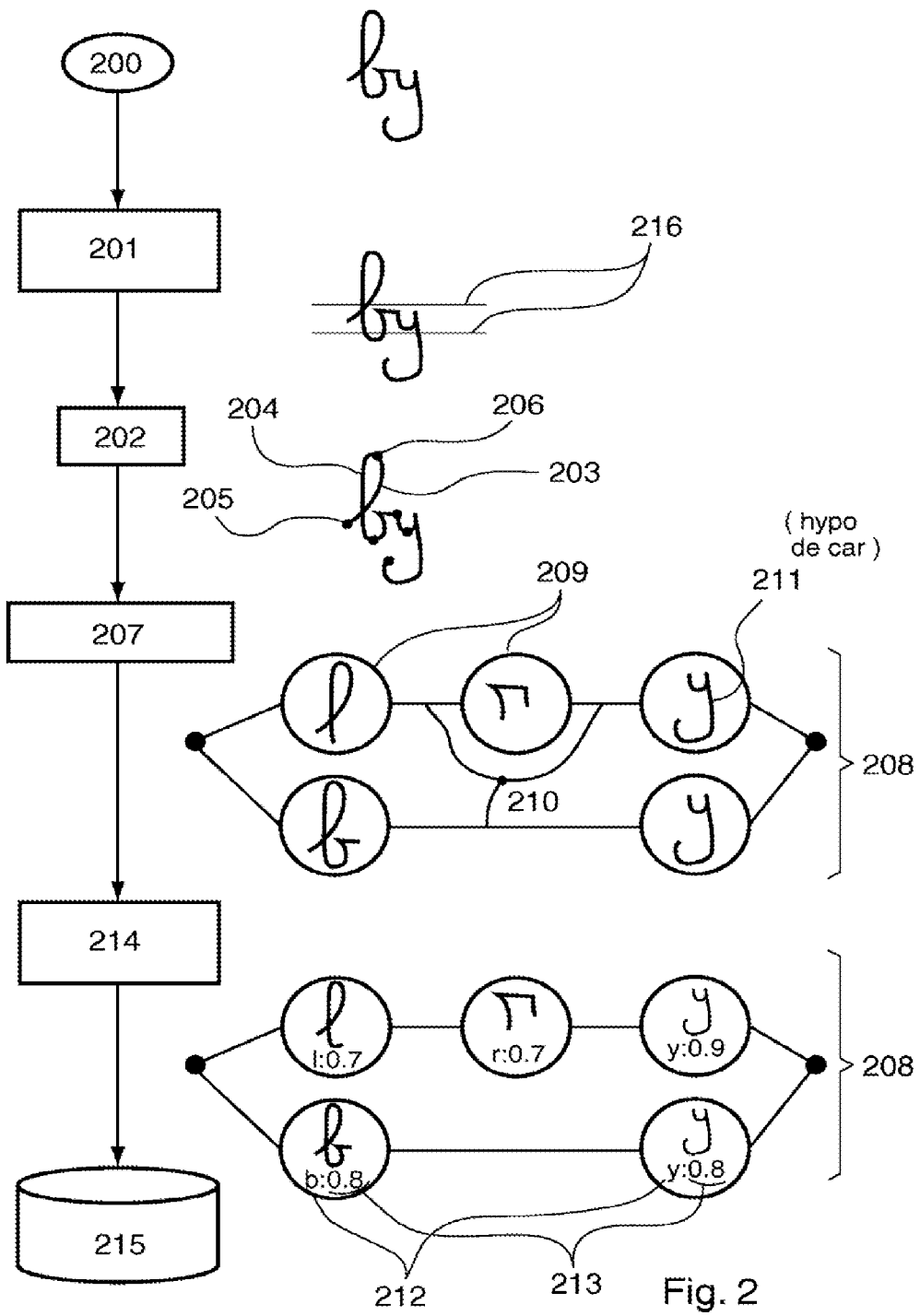
FIG. 2 shows the various steps implemented by the operation for converting said ink data into intermediate data, in an intermediate format.

In this preferred embodiment of the invention, the step 100 for converting the ink documents 101 into an intermediate format 102, stored in the form of at least one segmentation graph, itself includes a predetermined set of operations to be executed, as shown in FIG. 2:

sectioning 202 of the set of ink data into at least one ink segment 203, 204 in said set of ink data 200, each of said segments 203, 204 being delimited by two consecutive adjacent segmentation points 205, 206;

the construction 207 of a segmentation graph 208 consisting of nodes 209 connected via branches 210. Each node 209 of the graph 208 includes at least one of the ink segments 203, 204 produced and each of its branches 210 connecting a first node 209 to a second node 209 defines a relationship of adjacency between at least one segment contained in the first node and at least one segment contained in the second node, so as to form at least one sequence 208 of segments. In accordance with the definition of paragraph, it is recalled here that in a preferred embodiment of the invention, an assumption of character defines a set of ink segments associated with a node of the segmentation graph;

the association 211 with each of the nodes 205, 206 of at least one predetermined character candidate 212 and at least one confidence score 213 with each of said assumptions 202, 206. Furthermore, it is specified that, in practice, a confidence score within the meaning of the invention indicates a probability that an ink segment, or that the combination of several ink segments, actually corresponds to a predetermined character.

It is also recalled here that, in this preferred embodiment of the invention, a recognition unit corresponds to a character, and the assumption of correspondence with a character corresponds to a character candidate (see definitions in paragraph 3).

the classification 214 of the assumptions of correspondence 212 based on the associated confidence scores 213.

This conversion step detailed in FIG. 2 results therefore in the generation of a file or a database 215 containing all of the segmentation graphs on which the search can be based.

One of the principal advantages of this step for converting the data or the ink documents consists in enabling the enhancement of the latter with information coming from the pre-processing thereof, based on a process for recognising writing.

Another advantage of this approach according to the invention relates to the possibility that it offers for only having to carry out one partial recognition operation on the converted ink documents. This partial recognition operation stands in opposition to a complete recognition operation which must take into account linguistic elements (lexicon, language model) for recognising the characters, by assessing the likelihood of a character with regard to context (other characters and/or adjacent words). On the other hand, the approach proposed within the framework of this invention makes it possible to completely overcome any lexical and linguistic constraint. It further makes it possible to carry out a maximum number of processing operations upstream from the search and recognition phase, with the objective of gaining computing time during the search and therefore response time for the returning of search results to the user, this time having to be as short as possible, i.e., of the order of a few hundred milliseconds to two or three seconds at a maximum.

Finally, this approach makes it possible to promote fast searching in data or documents not yet previously recognised.

In order to carry out this step for converting original ink data or documents 101, a first operation for sectioning 202 into a plurality of segments is carried out for each of the characters contained in this data or these documents.

A sectioning step such as this can be carried out at various levels: e.g., a phrase into words, a word into characters and a character into ink segments. It can also differ on the basis of the style of writing being analysed (cursive writing, uppercase letter or isolated character).

In a preferred embodiment of this invention, the sectioning is carried out at the character level. This then involves carrying out segmentation directly at the character level. However, it is important to emphasize that this does not necessarily mean that segmentation will necessarily be carried out one-by-one on the characters in question, which would require an additional and costly step for preliminary detection of separate characters in the textual or handwritten writing, even though techniques exist for that.

To the contrary, in the approach advocated here, segmentation may be carried out both on the characters and on a portion of the characters alike, or else even on all or a portion of a set of interconnected characters. What is important is that the search and/or recognition engine 116 is able to define a certain number of segmentation points ("segmentation cuts") which must serve as a basis for forming assumptions of characters on the segments or the combinations of the segments thus determined.

In order to carry out this step 202 for sectioning or segmenting the ink data or documents 101 on which the search and recognition will have to be based, several types of criteria can be considered. As a non-limiting and illustrative example, the following criteria are cited:

determination of extremum and minimum in the handwriting, relative to a vertical axis;

detection of points of strong curvature or points of inflection in the characters or sets of handwritten characters;

detection of an increasing slope-start;

detection of a decreasing slope-start;

detection of a stopping point due to a heightening of the writing means;

detection of an affixation point for the writing means; detection of intersection(s).

The result of this first sectioning operation leads to the generation of a set of ink segments which will be used for determining the assumptions of characters, each ink segment thus determined being delimited by two consecutive adjacent segmentation points.

If necessary, in an alternative to the preferred embodiment of the invention, and according to the level of quality required for the search and recognition result, a pre-processing 201 may be applied to the ink so as to normalise it and thereby render it invariable and independent of the initial writing style.

This normalisation 201 can be carried out both by playing with the inclination of the outline of the handwriting ("slant correction") relative to a substantially vertical referent, with the rotation of the writing relative to an axis of rotation, or with the height of the writing, that latter being capable of being brought back between reference lines 216 separated by a predetermined distance. It is clear that this normalisation step 201 may be based on any other normalisation criteria not listed here.

Furthermore, the step 207 for constructing the segmentation graph will have the primary role of associating or consolidating the ink segments, in the form of sequences of ink segments, for the purpose of determining corresponding assumptions of character.

In executing this step 207, an estimate will be made of the probability 213 that an ink segment might be a given character 212, the set consisting of said probability 213 and said given character 212 forming a character candidate 211. Then, the operation will be repeated for this same segment by associating it with the segment immediately following it, for the purpose of optimising the path or paths to be investigated within the segmentation graph. In this way, a relationship of ascendancy/descendancy is defined between the segments of the same sequence of characters thus determined. It is also recalled here, and in accordance with the definitions of paragraph 3, that a assumption of character 211 consists of one to N>0 consecutive ink segments, each of the nodes of the segmentation graph containing one assumption of character.

At the end of the step for constructing the segmentation graph, all of the determined possible assumptions of character 211 are obtained for the handwritten documents within which the search will be carried out.

Furthermore, it may be that, at the end of this step for constructing the segmentation graph, certain assumptions of character 211 have a very low confidence score 213, or at the very least less than a predetermined threshold value, in order that the ink segments associated with a assumption of character 211 correspond or belong to a given character 212.

For this reason, during the course of or else after executing the step for creating the segmentation graph, it is possible to perform additional processing consisting in pruning the branches thereof which correspond to assumptions having a very low probability. The advantage of such an additional step relates in particular to optimising the search and recognition in ink, since the number of assumptions of character to be tested will be less significant since the segmentation graph path or paths to be investigated will have an optimised depth, another positive consequence of which will be an appreciable decrease in the overall response time, without necessarily altering the quality of the result that will be returned to the user.

This segmentation graph 208 is next the object of processing via the character classification step 214 which, by means of a characteristic extraction method 214, will calculate, for each assumption of character 211 corresponding to each node 209 of the segmentation graph 208, a set of scores 213 indicating the probability that a assumption is actually one character rather than another.

For non-limiting illustrative purposes, this classification step may be based on at least one of the following means:
Kohonen neural networks;
a support vector machine;
kernel methods;
fuzzy logic systems;
hidden Markov models;
neural networks.

The result of this classification of each assumption of character corresponding to each node can be represented in the form of a list of the best character candidates 212 (or "top-list"), ranked by decreasing confidence scores 213, each candidate actually being assigned a confidence score.

After this recognition step at the character level, the recognition system presents various candidates for each assumption of character. At this stage, some of these candidates can be rejected or validated, as soon as they have a confidence score lower, or else, on the contrary, higher than a predetermined threshold. It is well understood that this threshold making it possible to retain or else reject a candidate may be configured by the user, e.g., based on the level of relevance of the search and/or recognition that they wish to obtain in terms of a result for their request.

The result derived from the execution of these various operations 201, 202, 207, 211, 214 is stored in an intermediate format, e.g., within a database 215. The major advantage of storing all or a portion of the results of executing the step 100, 113 for converting the original ink data relates to the possibility of being able to preserve a maximum amount of information about the original data, so as to be able to carry out optimum recognition in terms of quality, with a minimum of errors. For non-limiting illustrative purposes, the following information will be stored in the database or in the file 215, at the completion of the step 100, 113 for converting the ink documents or data:
a set of said nodes;
a list of said character candidates for each of said nodes;
a confidence score for each of the character candidates of each of the nodes;
a location of each of said nodes in said set of stored raw ink data, said location being defined by at least one segmentation point;
information relating to the fact that a node is adjacent to a space separating two ink segments.

Thus, it is on the basis of this character segmentation graph that the actual search and recognition step will be carried out, so as to optimally determine which portions of the ink correspond to the word, to the expression or to the searched term. It will be recalled here that by term it is understood to mean any succession or chain of characters, symbols, punctuation elements, etc., whether it is does or does not have any particular meaning.

Once the preliminary step 100, 113 has been carried out, for converting the ink data or documents in which the searches will have to be carried out, the user requests for searching within this ink data or these ink documents can be implemented.

It is to be emphasized again that the conversion step is carried out once and for all at the time of storing in the file or database 215. Each time that a modification of this ink data, or an addition of new ink data is made, the preliminary conversion step 100, 113 will be rerun, so that the search can also take into account the added and/or modified data.

A process for encoding the user's request is implemented within the framework of this invention and aims to convert the search request into a format that is more easily exploitable by the method according to the invention.

In the description of this embodiment of the invention, it will be considered that the request is input in a text format (e.g., ASCII).

As mentioned previously, this invention proposes to break down the recognition process into two parts: a first part consisting in the conversion of the ink data into an intermediate format in the form of a segmentation graph, and a second part corresponding to the actual search.

These two steps are intentionally separated, contrary to the known systems of the prior art, for the purpose of preparing upstream all of the operations that will be necessary and common to all possible subsequent requests of a user.

Indeed, each time that a request 103 is made by a user, a corresponding request automaton is generated 105. This finite-state request automaton 105 will play the role of a language model capable of influencing the recognition probabilities during the search.

As the ink-related information retained during the conversion step 112, 113 contains only assumptions of character 211, with their character candidates 212 and their respective scores 213, the request automaton generated 105 will serve to orient the result 109 of the search at the time of recognition.

The search and recognition within the meaning of the invention is thus strongly oriented by the request 103, the assumptions of character 211 being reinterpreted according to constraints aiming to explicitly find the ink portions responding to the request, within the file of converted ink data or documents.

Formulation of the request in the form of a request automaton not only makes it possible to overcome the linguistic constraints imposed by conventional lexicons, but to also carry out much more advanced searches. Among the examples of using automatons for carrying out advanced searches, the following can be mentioned:
  searching for any succession of characters (proper name, company name, an acronym, etc.), etc.;
  taking the case into account (uppercase/lowercase);
  the use of logical operators (Boolean [and, or, not] or the like);
  searching for regular expressions.

In summary, it is the search module 106 of FIG. 1 which, by browsing the request automaton, will attempt to find the elements having correspondence in the ink document or documents within which the search in ink must be carried out, via the segmentation graph.

In order to optimise the operation of the search module 106 and to improve the relevance of the search results that will be returned to the user, the latter may use logical operators (OR, AND, AND NOT, NOT, etc., for example) within their request.

Provided below is an example of the use and consideration of these logical operators by the search module 106: if a user inputs into their request the terms "CALIFORNIA AND NOT SAN FRANCISCO," the request automaton will transform the user's request into "CALIFORNIA" OR "SAN FRANCISCO," so that the search module 106 will be content to search for all of the occurrences of each of the two searched words.

The request automaton thus formed can therefore be assimilated to a language model making it possible to optimise the processing of the request and to improve the quality of the search, in terms of the relevancy of the result.

In particular, when the search must be applied simultaneously to several ink documents, the contribution of the search module 106 is all the more important and significant.

The use of the logical operators within the request can enable finer filtering in the search phase, and thus the assignment of a better determined overall score in the evaluation of the relevancy of a document with respect to the contents of the user's request.

In order to determine the result returned to the user, the score that is assigned to each document takes account of the quantity and quality of the instances of the terms making up the request. In the example mentioned above, a positive occurrence of the chain "san francisco" in a document also containing "california" will hurt the final score associated with said document, compared to a document in which only at least one occurrence of "california" would have been determined.

In this case, the encoding of the user's request will also aim to define filters and rules for ranking the search results, which may be activated at the step for compiling the search results, between the end of the search and the transmission of the results to the user.

FIGS. 4 and 5 show a request automaton making it possible to represent such a language. In anticipation of carrying out a quick search, the result of recognising the text around the request is not taken into account. The language model of the text around the request is approximated by the possibility of recognising any succession of characters, noted *40 and 50, respectively, in FIGS. 4 and 5, before and after the request formulated by the user. In a novel and inventive way, an approach such as this makes it possible to appreciably improve the processing time and the quality of the result or results returned to the user, compared to a conventional recognition operation according to the known techniques of the prior art, which are based on or use an often fixed and/or non-expandable lexicon.

A bonus 42, 52 must be inserted upon inputting the user's request in order to induce the recognizer to borrow, from the automaton, the path actually corresponding to the contents of the request 41, 51 rather the one corresponding to the undefined text noted *40, 50. As a matter of fact, the text model making it possible to recognise any succession of characters, could, if necessary, recognise the term of the request.

By adding this bonus 42, 52, the recognizer's incentive to browse one path of the request automaton rather than another is strengthened. This bonus 42, 52 can be parametrized by the user and represented in the form of a detection sensitivity threshold. The higher the bonus, the easier the detection of the request, and, in contrast, the more the recognition quality will be reduced. As a complementary and non-limiting example, the addition of a high bonus will have a tendency to increase the risk of false detection or false acceptance. Thus the allocation of a high bonus for the term "CALIFORNIA" may also turn up near occurrences of the type "CAROLINA".

Conversely, a bonus having a very low value will result in a detection defect. As a simple illustrative example, a bonus set to the value 0 (zero) will necessarily cause the issuance of a zero search result, since there will be no incentive for the recognizer to browse one path of the request automaton rather than another.

The search is thus completely oriented by the request automaton, which is similar to a language model created at the time the user's request is encoded.

Correspondingly, the search engine 116 does not have the objective of recognising all of the elements of an ink document. It will be limited to searching for instances for which the probabilities retained during the phase for converting the ink data in the form of a segmentation graph are strongest for the object sought.

In order to facilitate the implementation of such an approach, dynamic programming (DP) is used. It makes it possible to dynamically carry out a comparison between the nodes of the segmentation graph and those of the request automaton.

This dynamic comparison consists in searching for the best path both in the segmentation graph and in the request automaton. A commonly used representation for such matching is a maximum likelihood lattice, as shown in FIG. 3.

The best path is defined as being the path having the minimum cost. The cost of a path is equal to the sum of the costs of the nodes which are associated with it in the segmentation graph and possibly of the costs of the arcs in the automaton. If the recognition system provides probabilities, these probabilities can be converted into costs by the function (−log).

The best path is displayed on the lattice and show which portion of the ink corresponds to which portion of the language model. In particular, it is now possible to locate in the stored ink the occurrences of the term or terms formulated by the user in their request.

As shown in FIG. 3, on the x-axis, the lattice receives the segmentation graph along with the complementary information added during the conversion step, and, on the y-axis, the request automaton created during the step for encoding the latter.

A result compiler 107 can also be implemented at the search engine 116 level. Its function is to sort and filter the results derived from the recognition and searching operations, based on the information input into the user's request.

At this stage of the process, the search (or ink writing recognition) part is completed. At its output, the search module 106 will provide the location in ink of the occurrences of the searched term as well as an associated confidence score for each of these occurrences.

In the hypothesis where the user's request is composed of several terms to be searched, e.g., "San Francisco" and "California," the search will be carried out by means of a single and unique request automaton taking into account the two terms of the request "San Francisco" and "California".

The result compiler 107 will receive the result data and carry out a sorting operation on the scores via thresholding, beyond which the data will not be retained. It is also possible to bring up all of the results by establishing a ranking based on the score obtained.

Several series of scores will be provided and combined by the results compiler 107 the function of which will then consist in bringing up the responses actually corresponding to the initial request of the user: "San Francisco" and "California," for example.

It is quite obvious that the method and the device according to the invention make it possible to carry out searches in ink of one or more handwritten documents.

When the search is carried out on a single ink document, the search result is returned to the user in the form of the location of the occurrences of the searched terms on a single document page. Here, the search is oriented to the object of the request, the user seeking to find the location of the ink in a document. A confidence score is then assigned to each occurrence.

When the search is carried out on several ink documents, the result of the search is returned to the user in the form of an ordered list of the documents containing the searched term. Here. The search is oriented to the document(s) in which the searched term is found, along with its score. A confidence score is thus assigned to each document.

In every case, it will be possible to provide the location of the object of the search, by showing it in a material way.

In other words, and advantageously so, on the one hand, the invention makes it possible to resolve the problems routinely encountered in terms of word segmentation of ink documents in which the searches must be carried out by recognition.

The invention also enables dynamic segmentation of the stored ink documents, as each process or executed search request is being carried out.

Advantageously, and contrary to the existing solutions of the prior art, a novel and innovative approach such as this further permits searching for words not necessarily recognised, and more generally speaking for any chain or sequence of characters and/or symbols with or without meaning, including, by extension, searching for any type of non-Latin writing character or symbol (Chinese or Japanese, for example). This extremely interesting result is obtained by a specific sectioning of the terms contained in the stored ink documents, not at the sentence, word or character level, but only at a lower level on a portion of a least one character.

This approach further makes it possible to overcome any linguistic constraint.

This approach according to the invention, implementing dynamic segmentation of the stored ink documents, can be easily implemented via dynamic programming. It further enables taking account of search requests in the stored ink documents which are much more complex and much more comprehensive, without any constraint of using a predetermined, fixed and non-adaptive and/or non-expandable lexicon.

In this sense, it makes it possible to overcome the constraints customarily associated with the necessity of being able to distinguish between uppercase or lowercase characters.

One additional advantage relates to the possibility of being able to use a formalised language model enabling optimisation of the inputting and consideration of the contents of the user request, but also, as a positive consideration, optimisation of the returned result, which often proves to be much more comprehensive and of a better quality.

It is also important to emphasize that such an approach according to the invention makes it possible to considerably limit the errors associated with ink recognition, since ink recognition is directly oriented by the contents of the request being searched. Thus, this approach is novel and inventive in the sense that it stands in direct opposition to the basic known techniques of the prior art, for which the recognition operation is carried out independently of the contents of the request.

The approach adopted in this invention advantageously promotes the quality of the recognition operation, on the one hand, but also the additional possibility of being able to request a precise and true location of the terms, words or sentences searched within the stored ink documents. This localisation can be carried out by underlining, hypertext link transformations or by any other method making it possible to apply a focus to the searched and actually recognised terms, directly to the contents of the stored ink documents. Several focuses can thus be applied to the text when a plurality of instances of the searched term have been detected in one or more of the stored ink documents.

Such an approach according to the invention also substantially promotes reduction of the processing time for a search request, the recognition step now being carried out in a very limited time period, which is not bothersome to the user.

Furthermore, it can be noted that since the search is separate from the pre-processing, these two operations can, in some cases, be carried out by separate and possibly remote devices. In particular, the pre-processing and storage can be ensured by remote servers, accessible via a local network or the Internet. The requests are then made on a terminal (computer, PDA, etc.), and processed by the server.

As already mentioned, the invention is not limited to the embodiment presented, but finds applications for other source data formats, and in particular voice data, which can in the same way be transformed into an intermediate format in the form of assumptions graphs. Processing is then similar.

The invention claimed is:

1. A method for searching for at least one term comprising at least one character, in at least one set of ink data including at least one handwritten character, the method comprising:
   an operation for converting each set of ink data into intermediate data, in an intermediate database, in the form of at least one segmentation graph including nodes, wherein:
      each node of said at least one segmentation graph represents one or more consecutive ink segments of a portion of the at least one handwritten character associated with at least one assumption of correspondence with a recognition unit and stores at least one confidence score indicating a probability that the one or more consecutive ink segments correspond with said recognition unit, and
      the at least one segmentation graph has a plurality of alternative paths formed by connecting a sequence of nodes in the order that the consecutive ink segments were presented in each set of ink data; and
   an operation for searching for said at least one term, carried out on said intermediate data by converting said at least one term into at least one request automaton adapted to said intermediate form and performing recognition of said ink data using said at least one request automaton as a language model defining one or more paths through the nodes of said at least one segmentation graph by searching for at least one path having the highest combined probability indicated by the at least one stored confidence score,
   said conversion operation being carried out once and for all during the storage of said at least one set of ink data and said search operation configured to be carried out at any time.

2. Search method of claim 1, wherein said conversion operation includes the following steps:
   sectioning said set into at least one ink segment, each of said segments being delimited by two consecutive adjacent segmentation points;
   constructing the at least one segmentation graph by connecting the nodes via branches, each node of said at least one segmentation graph including at least one of said one or more consecutive ink segments and each branch of said at least one segmentation graph connecting a first node to a second node in order to define a relationship of adjacency between at least one segment contained in said first node and at least one segment contained in said second node;
   associating each of said nodes with the at least one predetermined assumption of correspondence with a recognition unit and the at least one confidence score indicating the probability that said at least one ink segment corresponds with said recognition unit;
   associating of the at least one confidence score with each of said assumptions of correspondence with a recognition unit; and
   classifying said assumptions of correspondence with a recognition unit based on the at least one confidence score.

3. Search method as claimed in claim 2, wherein said search operation comprises the following steps:
   obtaining an input request including said term being searched;
   converting the contents of said input request into at least one request automaton configured to said intermediate format;
   searching for at least one correspondence between said term and at least one element of said intermediate data; and
   presenting or transmitting of at least one search result.

4. Search method as claimed in claim 3, wherein said request automaton is the type belonging to the group including at least one finite-state automaton.

5. Search method as claimed in claim 3, wherein said step for converting into at least one automaton comprises at least the following steps:
   sectioning the contents of the request into recognition units belong to the group including at least:
      syllables;
      phonemes;
      graphemes;
      characters; and
   storing each of the recognition units in a state of the request automaton, so that each state of said request automaton contains a recognition unit of said input request and so that each branch of said request automaton connecting a first state with a second state defines a relationship of ascendancy or descendancy between said recognition units contained in said first and second states.

6. Search method of claim 5, wherein said search operation includes an establishment of correspondence of each of said recognition units contained in each of said states of said request automaton with at least one node of said graph, so as to identify the nodes of said graph having the strongest probability of correspondence with said recognition unit.

7. Search method as claimed in claim 5, wherein during said search operation, progress occurs simultaneously in said graph and in said request automaton, so that, when correspondence is between a first node of said segmentation graph and a first character contained in a first state of said request automaton was able to be established, a second state descending directly from said first state of said request automaton is selected, and a node is determined in the graph, which descends directly from said first node and which has the highest probability of correspondence with said second recognition unit.

8. Search method of claim 7, wherein said establishment of correspondence between said segmentation graph and said request automaton uses a maximum likelihood lattice, including, on the x-axis, said graph of said ink segments, and, on the y-axis, said request automaton.

9. Search method as claimed in claim 7, wherein the path of said graph and of said automaton with states at a minimum cost are determined by calculating the sum of the confidence scores assigned to said nodes of said graph and to a plurality of arcs of transition between said states of said automaton.

10. Search method as claimed in claim 3, wherein said step of presenting or transmitting at least one search result further returns location information for each of the occurrences recognised within one of said sets of ink data or identification information for said set of ink data.

11. Search method as claimed in claim 2, wherein said classification step has, for each node of said segmentation graph, a list of said assumptions of correspondence of said node with a predetermined recognition unit, in order of decreasing confidence score.

12. Search method of claim 11, wherein said classification step implements a filtering of said most probable assumptions of correspondence, by comparing said confidence scores with a predetermined threshold value.

13. Search method as claimed in claim 2, wherein said classification step is based on at least one of the following techniques, based on:
Kohonen neural networks;
a support vector machine;
kernel methods;
fuzzy logic systems;
hidden Markov models; and
neural networks.

14. Search method as claimed in claim 2, wherein said characters forming raw ink data define at least two reference lines, wherein said segmentation points are determined according to at least one of the criteria belonging to the group including:
an extremum and minimum determined relative to the reference lines;
an inflection point;
an increasing slope-start;
a decreasing slope-start;
a stopping point due to a heightening of some writing means;
an affixation point for some writing means; and
intersecting lines.

15. Search method as claimed in claim 1, wherein said conversion operation comprises a preliminary operation for normalising an outline of said characters forming raw ink data, via control or correction of at least one of the parameters belonging to the group comprising:
an inclination value, relative to at least one reference direction;
a coefficient of rotation, relative to at least one given axis;
a line thickness; and
a character height or a width relative to at least two reference lines, so as to provide a normalised set of ink data.

16. Search method as claimed in claim 1, wherein said conversion operation includes a step for pruning the branches of said segmentation graph the nodes of which contain the assumptions of correspondence with a recognition unit having a low confidence score.

17. Search method as claimed in claim 1, wherein said conversion operation includes a storage step and ensures storage of at least some of the following information:
a set of said nodes;
a list of said assumptions of correspondence with a recognition unit for each of said nodes;
a confidence score for each of the assumptions of correspondence with a recognition unit of each of the nodes;
a location of each of said nodes in a set of stored raw ink data, said location being defined by at least one segmentation point; and
information relating to the fact that a node is adjacent to a space separating two ink segments.

18. Search method as claimed in claim 1, wherein said searched term belongs to the group including at least one typewritten character or handwritten text.

19. A non-transitory computer readable recording medium comprising a program for executing the steps for a method for searching for at least one term in a set of ink data including at least one handwritten character, said term being in the form of an input signal for a request input by a user, said program comprising the functions of:
converting the set of said ink data into intermediate data, in an intermediate database, in the form of at least one segmentation graph including nodes, wherein:
each node of said at least one segmentation graph represents one or more consecutive ink segments of a portion of the at least one handwritten character associated with at least one assumption of correspondence with a recognition unit and stores at least one confidence score indicating a probability that the one or more consecutive ink segments correspond with said recognition unit, and
the at least one segmentation graph has a plurality of alternative paths formed by connecting a sequence of nodes in the order that the consecutive ink segments were presented in the set of ink data;
searching for said at least one term, carried out on said intermediate data, by converting said at least one term into at least one request automaton adapted to said intermediate form and performing recognition of said ink data using said at least one request automaton as a language model defining one or more paths through the nodes of said at least one segmentation graph by searching for at least one path having the highest combined probability indicated by the at least one stored confidence score,
said conversion function being carried out once and for all during the storage of the ink data and said search function configured to be carried out at any time.

20. A non-transitory computer readable recording medium comprising a program for executing a regular expression language for formulating a search request for a set of stored ink documents in an intermediate data format, wherein said language includes instructions for converting said request in the form of a request automaton configured to be directly exploited during execution of the program included in the computer readable recording medium of claim 19.

21. A device for searching for at least one term comprising at least one character, in at least one set of ink data including at least one handwritten character, comprising:
means for searching for said at least one term, carried out on intermediate data, previously stored in storage means by means for converting each set of ink data into intermediate data, in an intermediate database, in the form of at least one segmentation graph including nodes, wherein:
each node of said at least one segmentation graph represents one or more consecutive ink segments of a portion of the at least one handwritten character associated with at least one assumption of correspondence with a recognition unit and storing at least one confidence score indicating a probability that the one or more consecutive ink segments correspond with said recognition unit, the at least one segmentation graph including a plurality of nodes each containing at least one ink segment belonging to a piece of data, each node of the graph configured to be connected upstream or downstream to other nodes of the segmentation graph, so that the possible relationships of ascendancy or descendancy might be established between the ink segments contained in each of the interconnected nodes in a plurality of alternative paths in the order that adjacent ink segments were presented in the ink data, and said means for searching is configured to search for said at least one term by converting said at least one term into at least one request automaton adapted to said intermediate form and performing recognition of said ink data using said at least one request automaton as a language model defining one or more paths through the nodes of said at least one segmentation graph by searching for at least one path having the highest combined probability indicated by the at least one stored confidence score.

22. Search device of claim 21, wherein said search device belongs to the group including at least:
a desktop or laptop computer;
a personal digital assistant;
a notepad;
a mobile telecommunication terminal;
a multimedia kiosk; and
a digital pen.

23. A device for converting ink data for searching for at least one term comprising at least one character, in at least one set of ink data including at least one handwritten character, wherein the device comprises:

means for converting the at least one set of ink data into intermediate data, in an intermediate database, in the form of at least one segmentation graph including nodes, wherein:

each node of said at least one segmentation graph represents one or more consecutive ink segments of a portion of the at least one handwritten character associated with at least one assumption of correspondence with a recognition unit and stores at least one confidence score indicating a probability that the one or more consecutive ink segments correspond with said recognition unit, the at least one segmentation graph has a plurality of alternative paths formed by connecting a sequence of nodes in the order that the consecutive ink segments were presented in the set of ink data, so that said searches for said at least one term are carried out on said intermediate data by converting said at least one term into at least one request automaton adapted to said intermediate form; and means for performing recognition of said ink data using said at least one request automaton as a language model defining one or more paths through the nodes of said at least one segmentation graph by searching for at least one path having the highest combined probability indicated by the at least one stored confidence score, said conversion being carried out once and for all during storage of said at least one set of ink data and said search being configured to be carried out at any time.

* * * * *